US012603779B2

(12) United States Patent
Zhang et al.

(10) Patent No.: US 12,603,779 B2
(45) Date of Patent: Apr. 14, 2026

(54) AUTHORIZING THIRD PARTY SPECIFIC USER IDENTITIES

(71) Applicant: QUALCOMM Incorporated, San Diego, CA (US)

(72) Inventors: Kefeng Zhang, Beijing (CN); Haris Zisimopoulos, London (GB); Sebastian Speicher, Wallisellen (CH); Yan Li, Beijing (CN); Zhimin Du, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 18/728,648

(22) PCT Filed: Mar. 29, 2022

(86) PCT No.: PCT/CN2022/083698
§ 371 (c)(1),
(2) Date: Jul. 12, 2024

(87) PCT Pub. No.: WO2023/184152
PCT Pub. Date: Oct. 5, 2023

(65) Prior Publication Data
US 2025/0158824 A1     May 15, 2025

(51) Int. Cl.
*H04L 9/32* (2006.01)
*H04L 65/1104* (2022.01)

(52) U.S. Cl.
CPC ........ *H04L 9/3213* (2013.01); *H04L 65/1104* (2022.05); *H04L 2209/80* (2013.01)

(58) Field of Classification Search
CPC ............... H04L 9/3213; H04L 65/1104; H04L 2209/80; H04L 65/1045; H04L 65/1046;
(Continued)

(56) References Cited

U.S. PATENT DOCUMENTS

| | | | | |
|---|---|---|---|---|
| 8,478,988 B2 * | 7/2013 | Nguyen | ................ | H04L 9/3066 |
| | | | | 713/155 |
| 2009/0068996 A1 * | 3/2009 | Bakker | .............. | H04L 65/1016 |
| | | | | 455/414.1 |

(Continued)

FOREIGN PATENT DOCUMENTS

| | | |
|---|---|---|
| CN | 1469585 A | 1/2004 |

OTHER PUBLICATIONS

Ericsson: "Div Verification Modifications", 3GPP TSG-CT WG1 Meeting #112bis, C1-186772, Oct. 19, 2018, Vilnius (Lithuania), Oct. 15-19, 2018, the whole document, 7 Pages.

(Continued)

*Primary Examiner* — J. Brant Murphy
(74) *Attorney, Agent, or Firm* — QUALCOMM Incorporated

(57) ABSTRACT

Various aspects of the present disclosure generally relate to wireless communication. In some aspects, an authentication, authorization, and accounting (AAA) server may authorize a use of a third party specific user identity based at least in part on verifying a token associated with a session initiation protocol (SIP) INVITE message with the third party specific user identity. The (AAA) server may transmit, to a call session control function (CSCF) of an originating service provider via a network exposure function (NEF) of the originating service provider, an enterprise name card that indicates the third party specific user identity based at least in part on authorizing the use of the third party specific user identity. Numerous other aspects are described.

30 Claims, 12 Drawing Sheets

600

(58) Field of Classification Search
CPC . H04L 65/1069; H04L 65/1073; H04L 63/10; H04L 65/1016; H04L 63/126; H04W 12/108; H04W 12/069; H04W 12/126
See application file for complete search history.

(56) References Cited

U.S. PATENT DOCUMENTS

| | | | | |
|---|---|---|---|---|
| 2010/0041375 | A1* | 2/2010 | Osborn | H04W 12/06 |
| | | | | 455/411 |
| 2011/0103373 | A1* | 5/2011 | Shatsky | H04L 65/1016 |
| | | | | 370/352 |
| 2012/0233334 | A1* | 9/2012 | Braudes | H04L 65/1069 |
| | | | | 709/227 |
| 2015/0220908 | A1* | 8/2015 | Young | G06Q 40/02 |
| | | | | 705/39 |
| 2018/0014168 | A1* | 1/2018 | Lau | H04M 7/006 |
| 2022/0060520 | A1* | 2/2022 | Carney Landow | |
| | | | | H04L 65/1104 |
| 2022/0086276 | A1* | 3/2022 | Ranalli | H04L 9/3247 |
| 2025/0175507 | A1* | 5/2025 | Axell | H04L 65/1073 |

OTHER PUBLICATIONS

International Search Report and Written Opinion—PCT/CN2022/ 083698—ISA/EPO—Dec. 15, 2022.

ATIS: "Signature-based Handling of Asserted Information Using Tokens (SHAKEN)-ATIS-1000074.v002", Nov. 1, 2021, pp. 1-21, XP055936369.

GSMA: "IMS Data Channel White Paper-Official Document NG. 129", Version 1.0, XP093312227, GSM Association, Dec. 21, 2021, pp. 1-105, p. 35, paragraph 6.2—p. 36, paragraph 6.2.1.

SA3LI (Ministere Economie Et Finances): Add. "STIR/SHAKEN/ eCNAM/RCD in Stage 2", 3GPP TSG-SA3 Meeting #82-LI-e-b, S3i210605, 3rd Generation Partnership Project, Mobile Competence Centre, 650, Route Des Lucioles, F-06921 Sophia-Antipolis Cedex, France, vol. SA WG3, No. Online, Sep. 1, 2021-Sep. 3, 2021, Aug. 24, 2021, XP052063984, 14 Pages.

Supplementary European Search Report—EP22934009—Search Authority—MUNICH—Oct. 17, 2025.

* cited by examiner

800

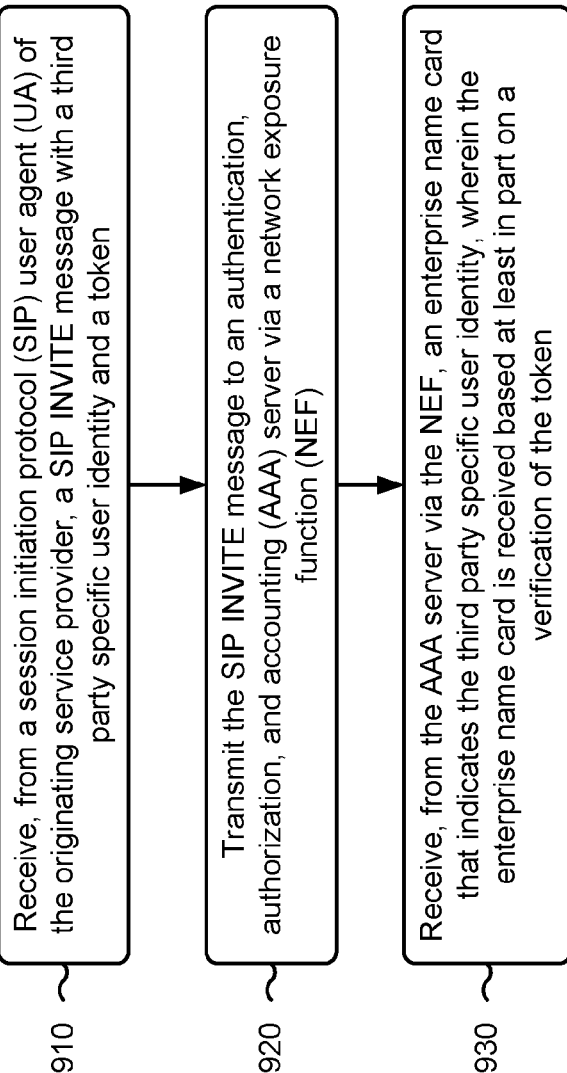

910 Receive, from a session initiation protocol (SIP) user agent (UA) of the originating service provider, a SIP INVITE message with a third party specific user identity and a token 920 Transmit the SIP INVITE message to an authentication, authorization, and accounting (AAA) server via a network exposure function (NEF)

930 Receive, from the AAA server via the NEF, an enterprise name card that indicates the third party specific user identity, wherein the enterprise name card is received based at least in part on a verification of the token

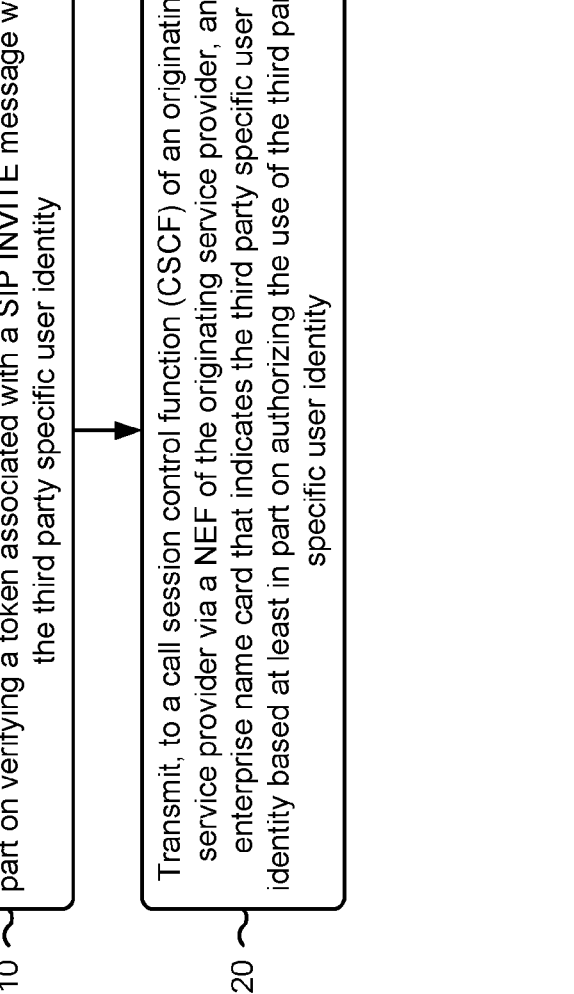

1010 ⌇ Authorize a use of a third party specific user identity based at least in part on verifying a token associated with a SIP INVITE message with the third party specific user identity 1020 ⌇ Transmit, to a call session control function (CSCF) of an originating service provider via a NEF of the originating service provider, an enterprise name card that indicates the third party specific user identity based at least in part on authorizing the use of the third party specific user identity

AUTHORIZING THIRD PARTY SPECIFIC USER IDENTITIES

CROSS-REFERENCE TO RELATED APPLICATION

This Patent Application is a 371 national stage of PCT Application No. PCT/CN2022/083698, filed on Mar. 29, 2022, entitled "AUTHORIZING THIRD PARTY SPECIFIC USER IDENTITIES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for authorizing third party specific user identities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus of a call session control function (CSCF) of an originating service provider for wireless communication includes a memory and one or more processors, coupled to the memory, configured to: receive, from a session initiation protocol (SIP) user agent (UA) of the originating service provider, a SIP INVITE message with a third party specific user identity and a token; transmit the SIP INVITE message to an authentication, authorization, and accounting (AAA) server via a network exposure function (NEF); and receive, from the AAA server via the NEF, an enterprise name card that indicates the third party specific user identity, wherein the enterprise name card is received based at least in part on a verification of the token.

In some implementations, an apparatus of an authentication includes a memory and one or more processors, coupled to the memory, configured to: authorize a use of a third party specific user identity based at least in part on verifying a token associated with a SIP INVITE message with the third party specific user identity; and transmit, to a CSCF of an originating service provider via an NEF of the originating service provider, an enterprise name card that indicates the third party specific user identity based at least in part on authorizing the use of the third party specific user identity.

In some implementations, a method of wireless communication performed by a CSCF of an originating service provider for wireless communication includes receiving, from a SIP UA of the originating service provider, a SIP INVITE message with a third party specific user identity and a token; transmitting the SIP INVITE message to an AAA server via an NEF; and receiving, from the AAA server via the NEF, an enterprise name card that indicates the third party specific user identity, wherein the enterprise name card is received based at least in part on a verification of the token.

In some implementations, a method of wireless communication performed by an authentication includes authorizing a use of a third party specific user identity based at least in part on verifying a token associated with a SIP INVITE message with the third party specific user identity; and transmitting, to a CSCF of an originating service provider via an NEF of the originating service provider, an enterprise name card that indicates the third party specific user identity based at least in part on authorizing the use of the third party specific user identity.

In some implementations, a non-transitory computer-readable medium storing a set of instructions for wireless communication includes one or more instructions that, when executed by one or more processors of a CSCF of an originating service provider, cause the CSCF of the originating service provider to: receive, from a SIP UA of the originating service provider, a SIP INVITE message with a third party specific user identity and a token; transmit the SIP INVITE message to an AAA server via an NEF; and receive, from the AAA server via the NEF, an enterprise name card that indicates the third party specific user identity, wherein the enterprise name card is received based at least in part on a verification of the token.

In some implementations, a non-transitory computer-readable medium storing a set of instructions for wireless communication includes one or more instructions that, when executed by one or more processors of an AAA server, cause the AAA server to: authorize a use of a third party specific user identity based at least in part on verifying a token associated with a SIP INVITE message with the third party specific user identity; and transmit, to a CSCF of an originating service provider via an NEF of the originating service provider, an enterprise name card that indicates the third party specific user identity based at least in part on authorizing the use of the third party specific user identity.

In some implementations, an apparatus for wireless communication includes means for receiving, from a SIP UA of an originating service provider, a SIP INVITE message with a third party specific user identity and a token; means for transmitting the SIP INVITE message to an AAA server via an NEF; and means for receiving, from the AAA server via the NEF, an enterprise name card that indicates the third party specific user identity, wherein the enterprise name card is received based at least in part on a verification of the token.

In some implementations, an apparatus for wireless communication includes means for authorizing a use of a third party specific user identity based at least in part on verifying a token associated with a SIP INVITE message with the third party specific user identity; and means for transmitting, to a CSCF of an originating service provider via an NEF of the originating service provider, an enterprise name card that indicates the third party specific user identity based at least in part on authorizing the use of the third party specific user identity.

Aspects generally include a method, apparatus, system, computer program product, non-transitory computer-readable medium, user equipment, base station, network entity, AAA server, CSCF of an originating service provider, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9-10 are diagrams illustrating example processes associated with authorizing third party specific user identities, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
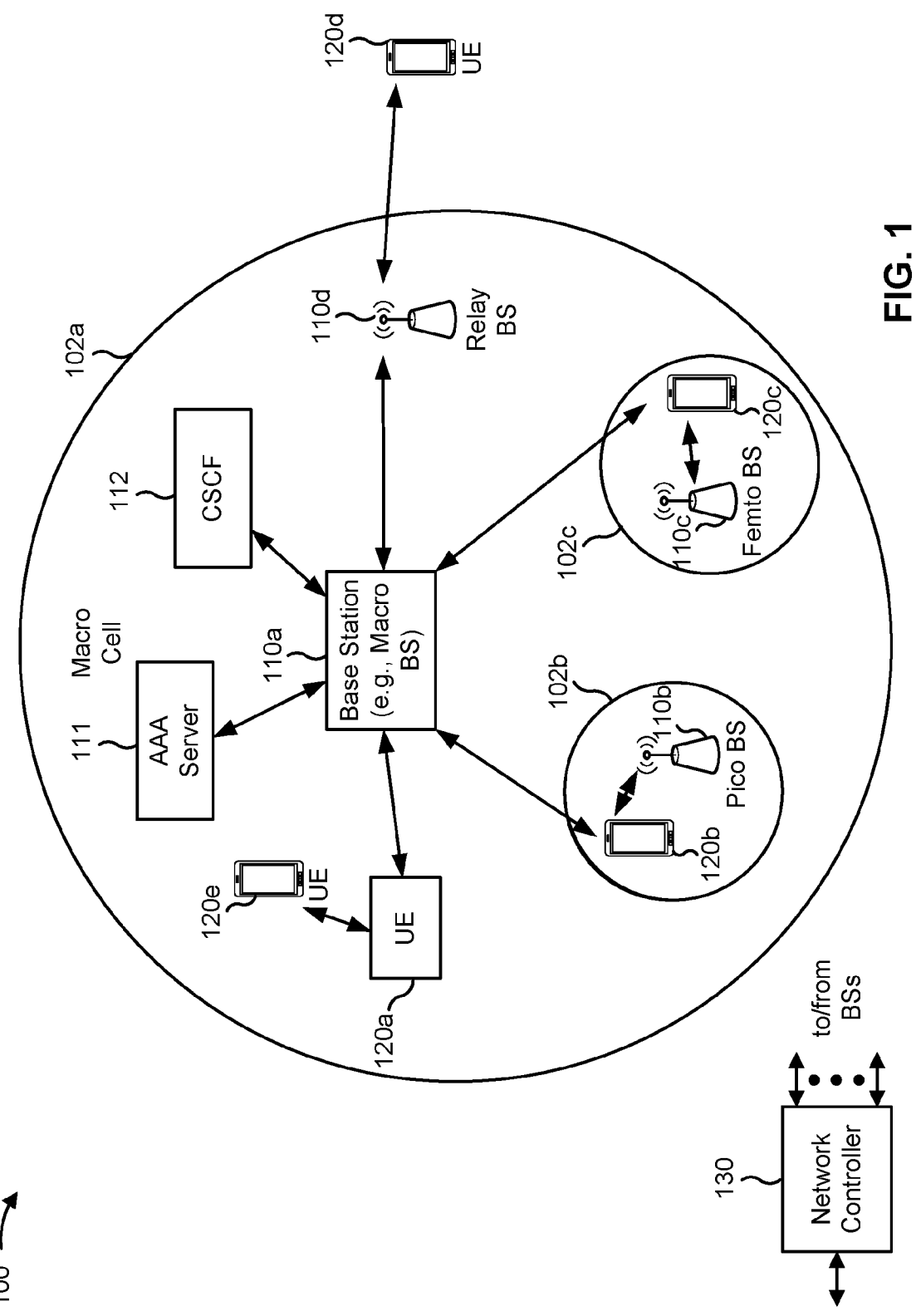
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, as described in more detail elsewhere herein, a call session control function (CSCF) of an originating service provider (e.g., CSCF 112) may receive, from a session initiation protocol (SIP) user agent (UA) of the originating service provider, a SIP INVITE message with a third party specific user identity and a token; transmit the SIP INVITE message to an authentication, authorization, and accounting (AAA) server via a network exposure function (NEF); and receive, from the AAA server via the NEF, an enterprise name card that indicates the third party specific user identity, wherein the enterprise name card is received based at least in part on a verification of the token. Additionally, or alternatively, the CSCF of the originating service provider may perform one or more other operations described herein.

In some aspects, as described in more detail elsewhere herein, an AAA server (e.g., AAA server 111) may authorize a use of a third party specific user identity based at least in part on verifying a token associated with a SIP INVITE message with the third party specific user identity; and transmit, to a CSCF of an originating service provider via an NEF of the originating service provider, an enterprise name card that indicates the third party specific user identity based at least in part on authorizing the use of the third party specific user identity. Additionally, or alternatively, the AAA server may perform one or more other operations described herein.

As indicated above, FIG. 1 is provided as an example. Other examples may differ from what is described with regard to FIG. 1.

Figure 2:
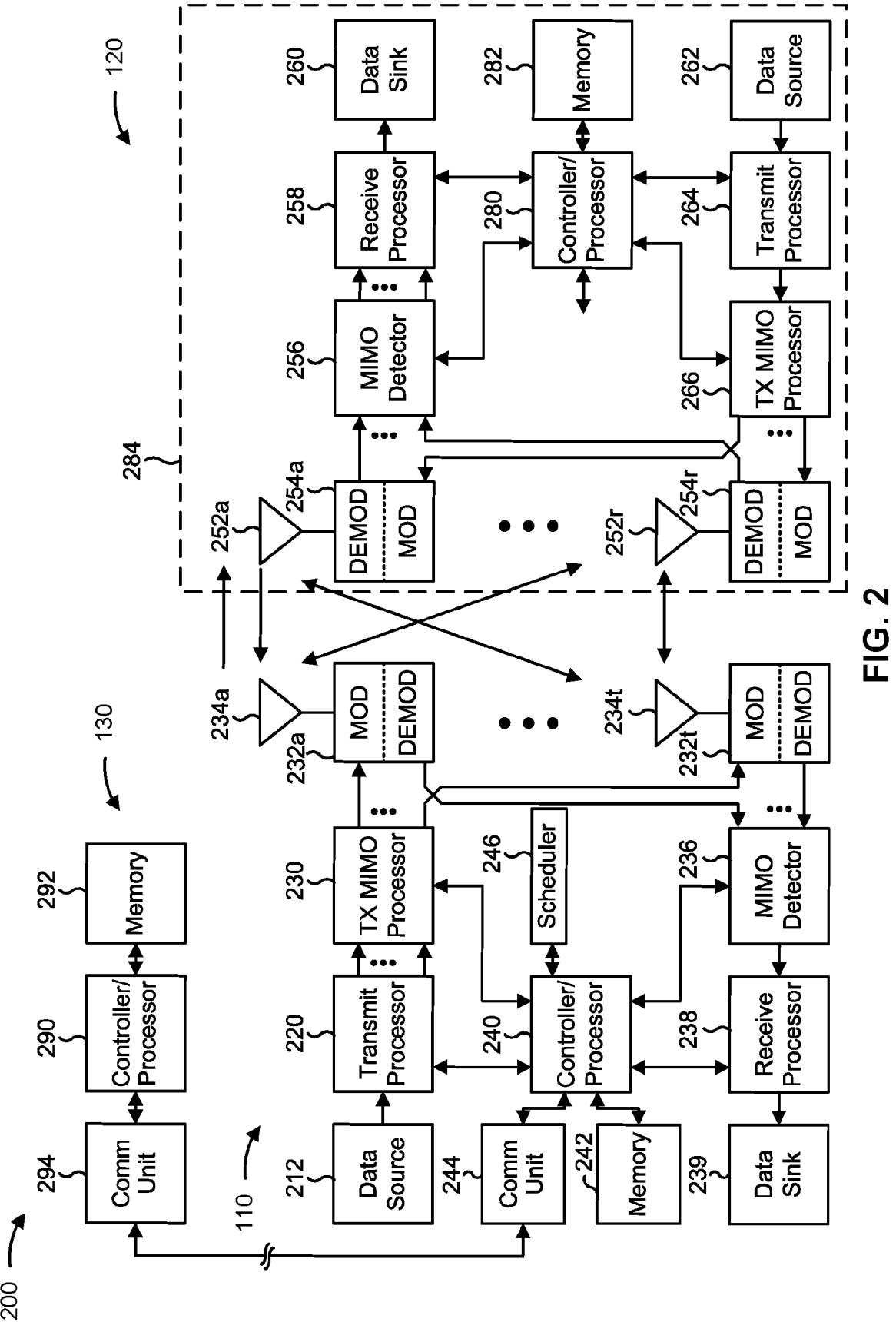
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., 7 antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the base station 110, the controller/processor 280 of the UE 120, and/or any other component(s) of FIG. 2 may perform one or more techniques associated with authorizing third party specific user identities, as described in more detail elsewhere herein. In some aspects, the third party AAA server and the CSCF described herein are the base station 110, is included in the base station 110, or includes one or more components of the base station 110 shown in FIG. 2. In some aspects, the SIP UA described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a CSCF of an originating service provider (e.g., CSCF 112) includes means for receiving, from a SIP UA of the originating service provider, a SIP INVITE message with a third party specific user identity and a token; means for transmitting the SIP INVITE message to an AAA server via an NEF; and/or means for receiving, from the AAA server via the NEF, an enterprise name card that indicates the third party specific user identity, wherein the enterprise name card is received based at least in part on a verification of the token. In some aspects, the means for CSCF of the originating service provider to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, an AAA server (e.g., AAA server 111) includes means for authorizing a use of a third party specific user identity based at least in part on verifying a token associated with a SIP INVITE message with the third party specific user identity; and/or means for transmitting, to a CSCF of an originating service provider via an NEF of the originating service provider, an enterprise name card that indicates the third party specific user identity based at least in part on authorizing the use of the third party specific user identity. In some aspects, the means for the AAA server to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
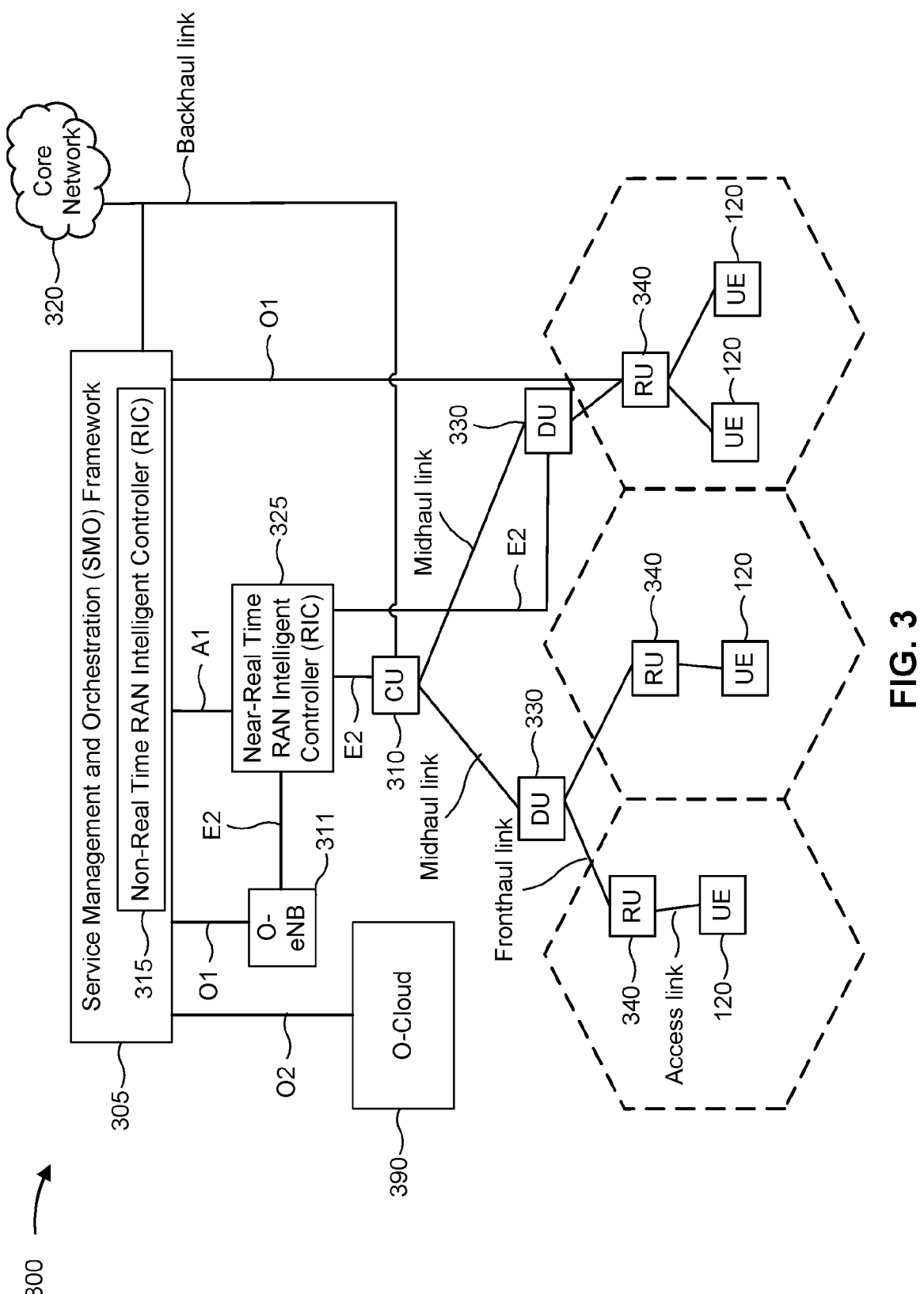
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

A signature-based handling of asserted information using tokens (SHAKEN) framework may utilize protocols that provide an end-to-end architecture for the authentication and assertion of a caller identifier (ID) by an originating service provider and the verification of the caller ID by a terminating service. The SHAKEN framework may be used by telephone service providers delivering phone calls over voice over Internet Protocol (IP) (VoIP). The caller ID may be an originating or calling party telephone number used to identify a caller. The caller ID may be carried in either a P-asserted identity or a form header of a session initiation protocol (SIP) message.

Figure 4:
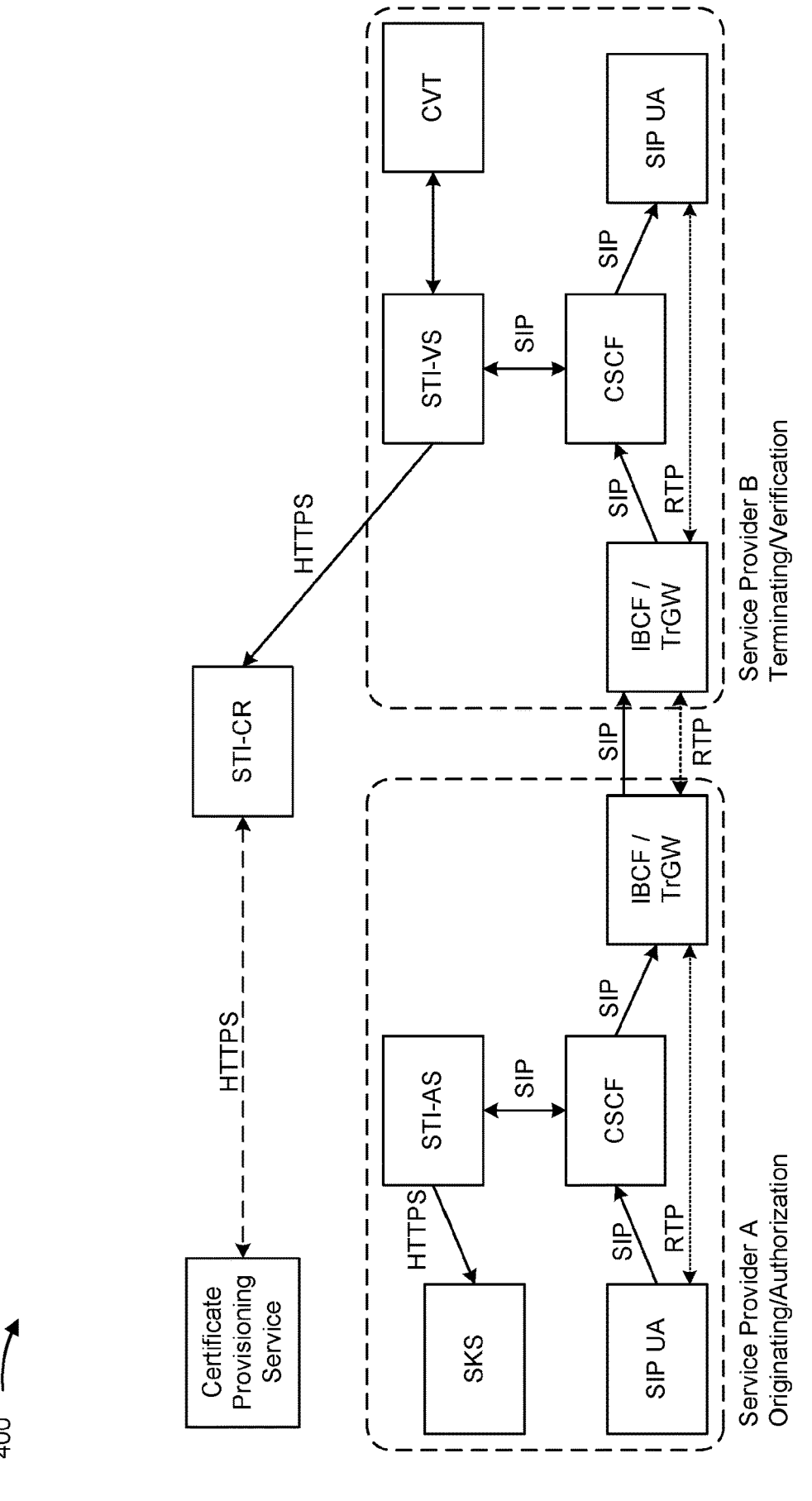
FIG. 4 is a diagram illustrating an example of a signature-based handling of asserted information using tokens (SHAKEN) framework, in accordance with the present disclosure.

FIG. 4 is a diagram illustrating an example 400 of a SHAKEN framework, in accordance with the present disclosure.

An originating IP Multimedia Subsystem (IMS) network may be hosted by a Service Provider A, and a terminating IMS network may be hosted by a Service Provider B. In other words, an originating service provider may be Service Provider A, and a terminating service provider may be Service Provider B. A SIP user agent (UA) may be authenticated by an originating service provider (OSP) network (e.g., associated with Service Provider A). When the SIP UA is under direct management control of the OSP network, the OSP network may assert a calling party identity in originating SIP INVITE requests initiated by the SIP UA. The IMS/call session control function (CSCF) may represent a SIP registrar and routing function. The CSCF may be a SIP server or a CSCF server. An interconnection border control function (IBCF)/transition gateway (TrGW) may be a function at an edge of a service provider network (e.g., a service provider network associated with Service Provider A or Service Provider B) that represents a network-to-network interface (NNI) or peering interconnection point between telephone service providers, and the IBCF/TrGW may be an ingress and egress point for SIP calls between providers.

A secure telephone identity (STI) authentication service (STI-AS) may be a SIP application server that performs the function of an authentication service. The STI-AS may be secure and contain a secure key store (SKS) of secret private key(s), or have an authenticated, transport layer security (TLS) encrypted interface to the SKS that stores the secret private key(s) used to create personal assertion token (PASSporT) signatures. The SKS may be a logical highly secure element that stores the secret private key(s) for access by the STI-AS. An STI verification service (STI-VS) may be a SIP application server that performs the function of a verification service. The STI-VS may have a hypertext transfer protocol secure (HTTPS) interface to a secure telephone identity certificate repository that is referenced in an identity header field to retrieve a provider public key certificate. A call validation treatment (CVT) may be a logical function (e.g., an application server function or a third-party application) for applying call analytics and treatment techniques after a signature is positively or negatively verified. A certificate provisioning service may be a logical service used to provision certificate(s) used for STI. A secure telephone identity certificate repository (STI-CR) may be a publicly accessible store for public key certificates.

As indicated above, FIG. 4 is provided as an example. Other examples may differ from what is described with regard to FIG. 4.

Figure 5:
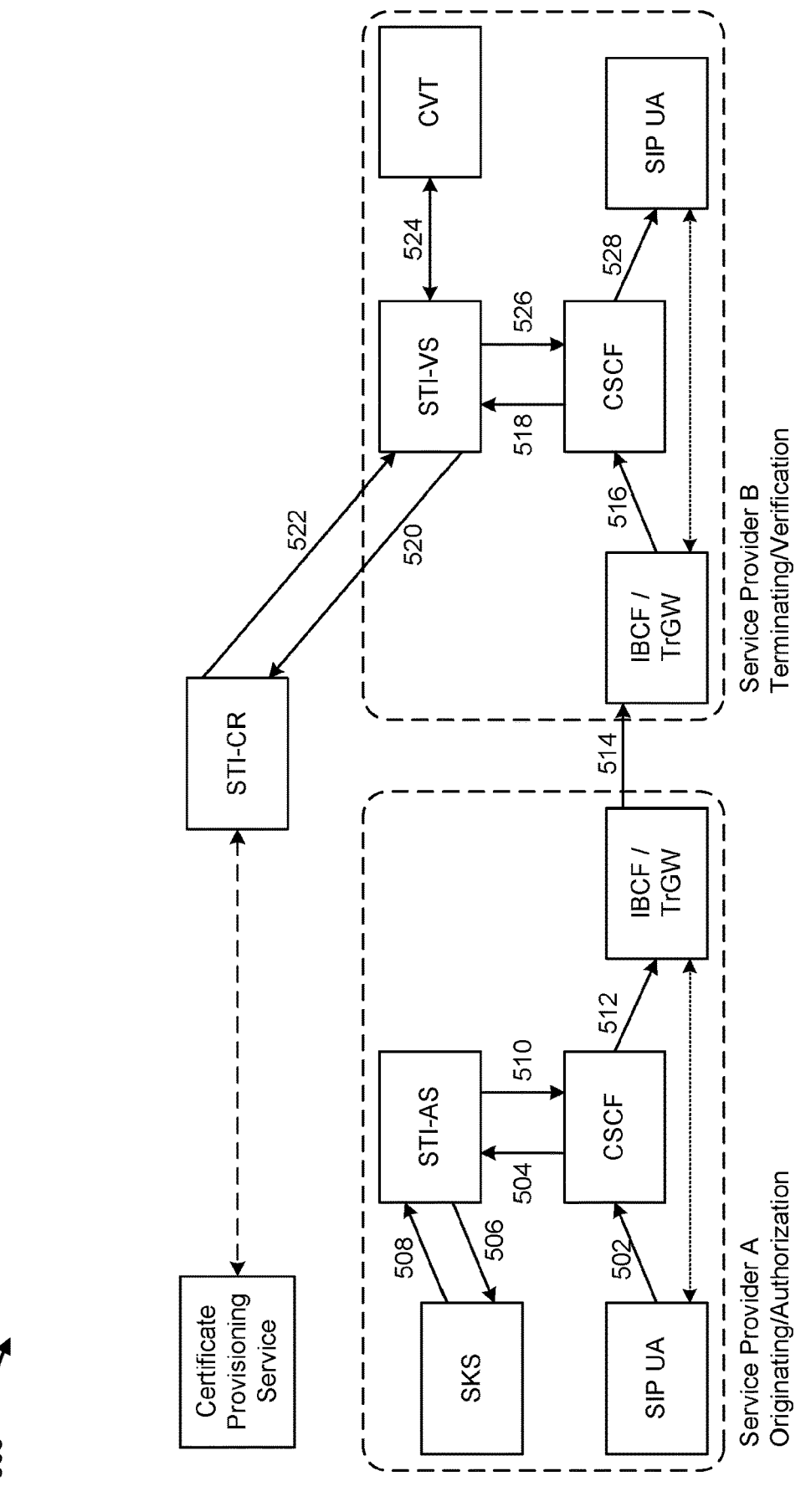
FIG. 5 is a diagram illustrating an example of a SHAKEN reference call flow, in accordance with the present disclosure.

FIG. 5 is a diagram illustrating an example 500 of a SHAKEN reference call flow, in accordance with the present disclosure.

As shown by reference number 502, a SIP UA of originating service provider, which may first be registered and authenticated to the CSCF of the originating service provider, may create a SIP INVITE message with a telephone identity. The telephone identity may be an identifier associated with an originator of a telephone call. In the SHAKEN framework, the telephone identity may be a SIP identity (e.g., a SIP uniform resource identifier (URI)) from which a telephone number may be derived. As shown by reference number 504, the CSCF of the originating service provider may add a "private extensions to SIP for asserted identity" (P-asserted-identity) header field asserting a caller ID of the SIP UA of the originating service provider. The CSCF of the originating service provider may initiate an originating trigger to the STI-AS of the originating service provider for the SIP INVITE message. As shown by reference number 506, the STI-AS of the originating service provider may determine, using a service provider-specific mechanism, a legitimacy of the telephone identity being used in the SIP INVITE message. The STI-AS of the originating service provider may securely request its private key from the SKS of the originating service provider.

As shown by reference number 508, the SKS of the originating service provider may provide the private key in a response, and the STI-AS of the originating service provider may sign the SIP INVITE message and may add identity header field(s) using the caller ID in the P-asserted-identity header field. As shown by reference number 510, the STI-AS of the originating service provider may provide the SIP INVITE message back to the CSCF of the originating service provider. As shown by reference number 512, the CSCF of the originating service provider may route the telephone call and the SIP INVITE message to an IBCF of the originating service provider (e.g., an egress IBCF). As shown by reference number 514, the SIP INVITE message may be routed over the NNI using a standard inter-domain routing configuration. As shown by reference number 516, an IBCF of the terminating service provider (e.g., an ingress IBCF) may receive the SIP INVITE message over the NNI. As shown by reference number 518, a CSCF of the terminating service provider may initiate a terminating trigger to an STI-VS of the terminating service provider for the SIP INVITE message.

As shown by reference number 520, the STI-VS of the terminating service provider may use a certain field in a PASSporT protected header to determine an STI certificate repository (STI-CR) URI and perform an HTTPS request to the referenced STI-CR. As shown by reference number 522, the STI-VS of the terminating service provider may validate a certificate and then extract a public key. The STI-VS of the terminating service provider may use the public key to verify a signature in the identity header field, which may validate the caller ID used when signing the SIP INVITE message by the STI-AS of the originating service provider. As shown by reference number 524, a CVT may be an optional function that may be invoked to perform call analytics or other spam mitigation techniques. The CVT may be integrated within a service provider network of the terminating service provider or may be outside the service provider network by a third party. As shown by reference number 526, depending on a result of an STI verification, the STI-VS of the terminating service provider may determine that the telephone call is to be completed with an appropriate value, and the SIP INVITE message may be passed back to the CSCF of the terminating service provider, which may continue to set up the telephone call to the SIP UA of the terminating service provider. As shown by reference number 528, the SIP UA of the terminating service provider may receive the SIP INVITE message and normal SIP processing of the telephone call may continue.

As indicated above, FIG. 5 is provided as an example. Other examples may differ from what is described with regard to FIG. 5.

Illegitimate caller ID spoofing is a concern for telephone services providers and customers. A secure telephone identity revisited (STIR)/SHAKEN framework may provide an end-to-end architecture for the authentication and assertion of a caller ID by an originating service provider and the verification of this identity by a terminating service. However, the STIR/SHAKEN framework does not provide a mechanism for authenticating other types of caller information by the originating service provider and verifying such other types of caller information by the terminating service provider.

In various aspects of techniques and apparatuses described herein, the STIR/SHAKEN framework may be enhanced to support the usage of third party specific user identities. The STIR/SHAKEN framework may be modified to incorporate a third party AAA server and a network exposure function (NEF). The third party AAA server may authorize a use of a third party specific user identity based at least in part on verifying a token associated with a SIP INVITE message. The SIP INVITE message may be created, by a SIP UA of an originating service provider, to include the third party specific user identity and the token. The third party AAA server may transmit, to a CSCF of the originating service provider via the NEF, an enterprise name card that indicates the third party specific user identity based at least in part on authorizing the use of the third party specific user identity. The enterprise name card may be transmitted to a SIP UA of a terminating service provider for display on the SIP UA of the terminating service provider. The enterprise name card may indicate other types of caller information (e.g., information other than a caller ID), such as a user, a photo of the user, a user identifier, and/or a company associated with the user, where the enterprise name card may be authorized using the third party AAA server. As a result, the third party specific user identities may be supported in the STIR/SHAKEN framework.

Figure 6:
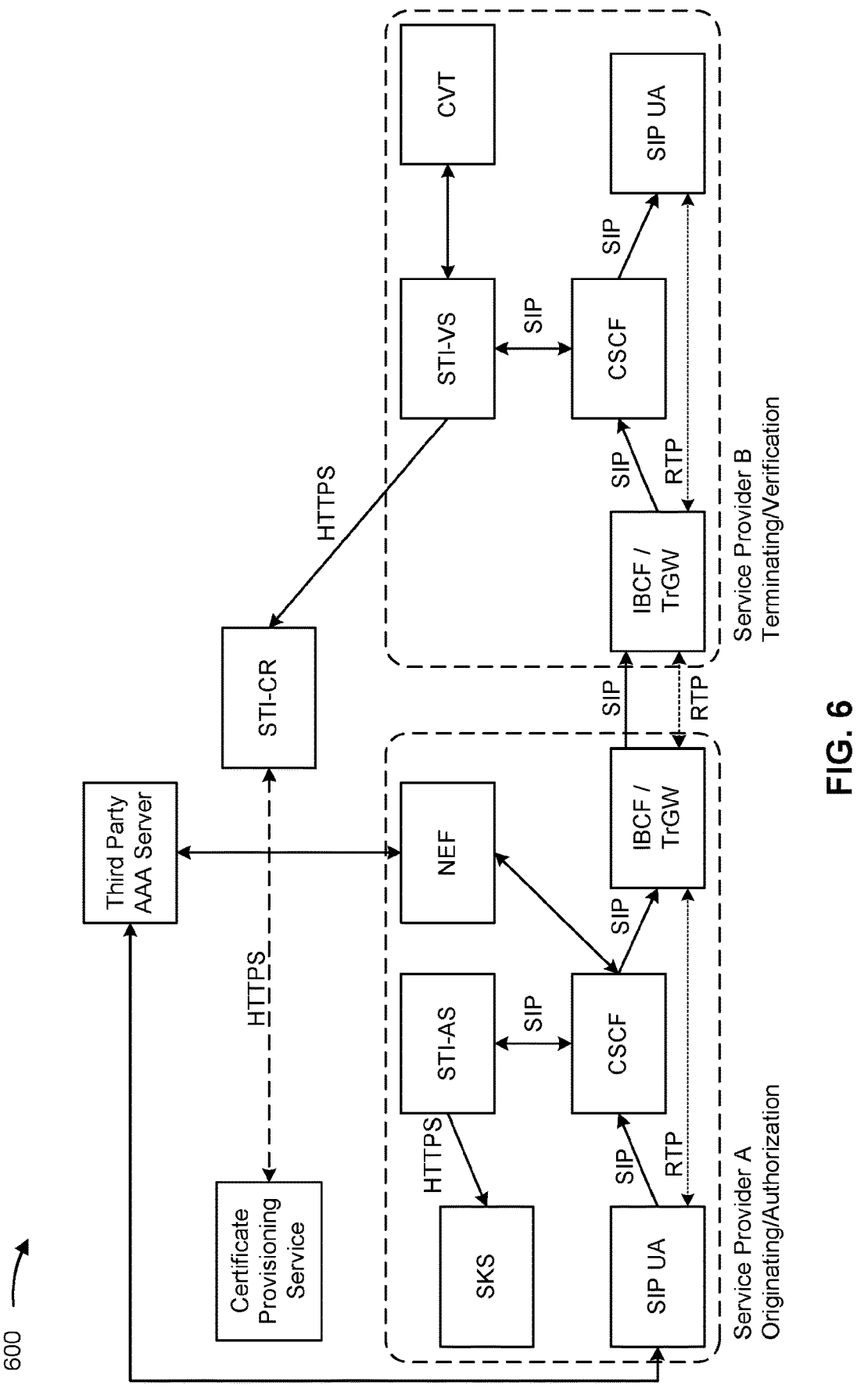
FIG. 6 is a diagram illustrating an example associated with a SHAKEN framework that includes a third party authentication, authorization, and accounting server and a call session control function, in accordance with the present disclosure.

FIG. 6 is a diagram illustrating an example 600 associated with a SHAKEN framework that includes a third party AAA server (e.g., AAA server 111) and a CSCF (e.g., CSCF 112), in accordance with the present disclosure. "Third party AAA server" and "AAA server" may be used interchangeably herein.

The SHAKEN framework may include an originating IMS network and a terminating IMS network. The originating IMS network may be hosted by an originating service provider (e.g., Service Provider A), and the terminating IMS network may be hosted by a terminating service provider (e.g., Service Provider B). The originating service provider may include a SIP UA, a CSCF, an STI-AS, an SKS, and an IBCF/TrGW. The terminating service provider may include a SIP UA, a CSCF, an STI-VS, a CVT, and an IBCF/TrGW. Further, the SHAKEN framework may include a certificate provisioning service and an STI-CR. These elements and related functionalities are further described with respect to FIG. 4.

In some aspects, the SHAKEN framework may include the third party AAA server and an NEF. The third party AAA server, the NEF, the SIP UA of the originating service provider, and the CSCF of the originating service provider may function to support the usage of third party specific user identities.

In some aspects, the SIP UA of the originating service provider may initiate a telephone call with the SIP UA of the terminating service provider. The SIP UA of the originating service provider may create a SIP INVITE message with a third party specific user identity and a token, which may be assigned by the third party AAA server to the SIP UA of the originating service provider. The third party AAA server may interact with the CSCF of the originating service provider via the NEF of the originating service provider, in order to authorize the usage of the third party specific user identity by the SIP UA of the originating service provider. The third party AAA server may verify the token of the SIP UA of the originating service provider for the authorization of the usage of the third party specific user identity. The verification of the token may be based at least in part on signaling between the third party AAA server and the CSCF of the originating service provider via the NEF of the originating service provider. When the third party specific user identity is authorized, the third party AAA server may issue an enterprise name card that indicates the third party specific user identity, where the enterprise name card may be associated with the SIP UA of the originating service provider. The enterprise name card may indicate a name of a user, a photo of the user, a user identifier, and/or a company associated with the user.

In some aspects, when the third party specific user identity is authorized based at least in part on the verification of the token, the third party AAA server may create the enterprise name card. The CSCF of the originating service provider may transmit the enterprise name card to the SIP UA of the terminating service provider. The enterprise name card may be indicated in a header of the SIP INVITE message, and the enterprise name card may be presented to the SIP UA of the terminating service provider for display based at least in part on a successful verification of the enterprise name card at the terminating service provider. When the third party specific user identity is not authorized based at least in part on an unsuccessful verification of the token, the telephone call may continue without presentation of the third party specific user identity.

In some aspects, prior to the SIP UA of the originating service provider creating the SIP INVITE message with the third party specific user identity and the token, the third party AAA server may be authorized by the originating IMS network to provide third party specific user identities for a specific group of SIP UAs. The SIP UA of the originating service provider may be authorized by the third party AAA server to use the third party specific user identity. In some aspects, the SIP UA of the originating service provider may be assigned the token for verification. The SIP UA of the originating service provider may receive the token from the third party AAA server based at least in part on a distribution of the token to the SIP UA of the originating service provider.

In some aspects, the NEF may support the authorization of the third party AAA server and an establishment of a secure association between the NEF and the third party AAA server. The NEF may support an interaction between the originating IMS network (e.g., the CSCF of the originating service provider) and the third party AAA server for authentication and authorization of SIP UAs for using third party specific user identities.

As indicated above, FIG. 6 is provided as an example. Other examples may differ from what is described with regard to FIG. 6.

Figure 7:
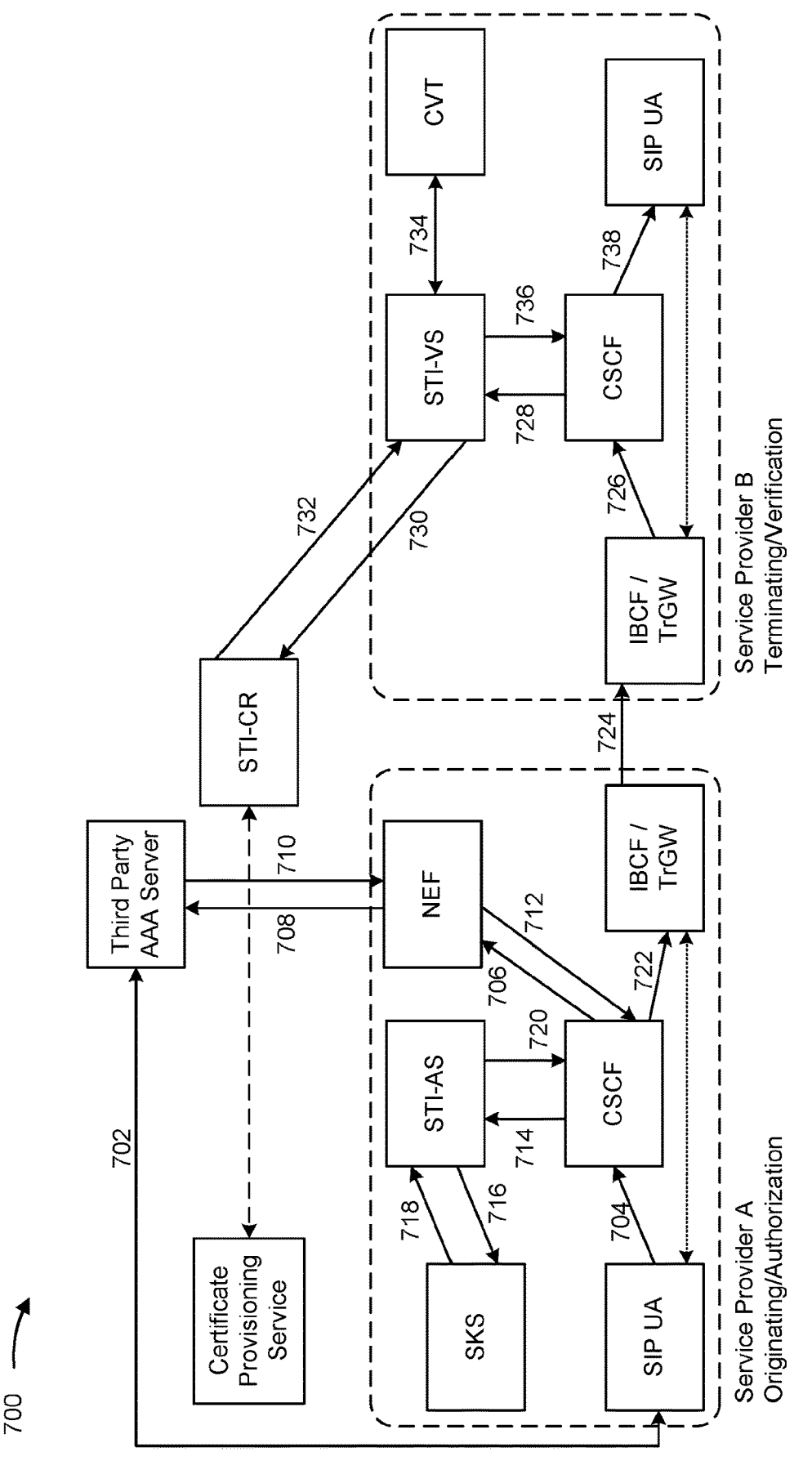
FIG. 7 is a diagram illustrating an example associated with authorizing third party specific user identities, in accordance with the present disclosure.

FIG. 7 is a diagram illustrating an example 700 associated with authorizing third party specific user identities, in accordance with the present disclosure.

The SHAKEN framework may include an originating IMS network and a terminating IMS network. The originating IMS network may be hosted by an originating service provider (e.g., Service Provider A), and the terminating IMS network may be hosted by a terminating service provider (e.g., Service Provider B). The originating service provider may include a SIP UA, a CSCF (e.g., CSCF 112), an STI-AS, an SKS, and an IBCF/TrGW. The terminating service provider may include a SIP UA, a CSCF, an STI-VS, a CVT, and an IBCF/TrGW. The SHAKEN framework may include a certificate provisioning service and an STI-CR. Further, the SHAKEN framework may include a third party AAA server (e.g., third party AAA server 111) and an NEF. The NEF may be associated with the originating service provider.

As shown by reference number 702, the third party AAA server may transmit a token to the SIP UA of the originating service provider. The third party AAA server may assign the token to the SIP UA of the originating service provider. As shown by reference number 704, the SIP UA of the originating service provider may create a SIP INVITE message with a third party specific user identity and the token. The third party specific user identity may indicate identification information of a user, such as a name of the user, a photo of the user, a user identifier, and/or a company associated with the user. The user identity may be "third party specific" since the user identity may indicate information associated with a third party, such as the company affiliated with the user. The SIP UA of the originating service provider may transmit the SIP INVITE message with the third party specific user identity and the token to the CSCF of the originating service provider.

As shown by reference number 706, the CSCF of the originating service provider may transmit, to the NEF, the SIP INVITE message with the third party specific user identity and the token to the CSCF of the originating service provider. As shown by reference number 708, the NEF may forward the SIP INVITE message with the third party specific user identity and the token to the third party AAA server. The CSCF of the originating service provider may transmit the SIP INVITE message with the third party specific user identity and the token to the third party AAA server via the NEF. The third party AAA server may authorize a use of the third party specific user identity based at least in part on verifying the token associated with the SIP INVITE message. As shown by reference number 710, the third party AAA server may transmit, to the NEF, an enterprise name card that indicates the third party specific user identity based at least in part on authorizing the use of the third party specific user identity. The enterprise name card that indicates the third party specific user identity may indicate a name of a user, a photo of the user, a user identifier, and/or a company associated with the user. The verification of the token may be based at least in part on signaling between the CSCF of the originating service provider and the AAA server via the NEF.

As shown by reference number 712, the NEF may transmit the enterprise name card to the CSCF of the originating service provider. The CSCF of the originating service provider may receive the enterprise name card from the AAA server via the NEF, where the enterprise name card may be received based at least in part on the verification of the token. As shown by reference number 714, the CSCF of the originating service provider may add a P-asserted-identity header field asserting the third party specific user identity of the SIP UA of the originating service provider. The CSCF of the originating service provider may initiate an originating trigger to the STI-AS of the originating service provider for the SIP INVITE message. As shown by reference number 716, the STI-AS of the originating service provider may determine, using a service-provider-specific mechanism, a legitimacy of the third party specific user identity being used in the SIP INVITE message. The STI-AS of the originating service provider may securely request its private key from the SKS of the originating service provider.

As shown by reference number 718, the SKS of the originating service provider may provide the private key in a response, and the STI-AS of the originating service provider may sign the SIP INVITE message and may add identity header field(s) using a caller ID in the P-asserted-identity header field and the third party specific user identity. As shown by reference number 720, the STI-AS of the originating service provider may provide the SIP INVITE message back to the CSCF of the originating service provider. As shown by reference number 722, the CSCF of the originating service provider may route the telephone call and the SIP INVITE message to the IBCF of the originating service provider (e.g., an egress IBCF). The CSCF of the originating service provider may transmit the SIP INVITE message, which may indicate the enterprise name card that indicates the third party specific user identity. As shown by reference number 724, the SIP INVITE message may be routed over the NNI using a standard inter-domain routing configuration. As shown by reference number 726, the IBCF of the terminating service provider (e.g., an ingress IBCF) may receive the SIP INVITE message over the NNI. As shown by reference number 728, the CSCF of the terminating service provider may initiate a terminating trigger to the STI-VS of the terminating service provider for the SIP INVITE message.

As shown by reference number 730, the STI-VS of the terminating service provider may use a certain field in a PASSporT protected header to determine an STI-CR URI and perform an HTTPS request to the referenced STI-CR. As shown by reference number 732, the STI-VS of the terminating service provider may validate a certificate and then extract a public key. The STI-VS of the terminating service provider may use the public key to verify a signature in the identity header field, which may validate the third party specific user identity. As shown by reference number 734, a CVT may be an optional function that may be invoked to perform call analytics or other spam mitigation techniques. The CVT may be integrated within a service provider network of the terminating service provider or may be outside the service provider network by a third party.

As shown by reference number 736, depending on a result of an STI verification, the STI-VS of the terminating service provider may determine that the telephone call is to be completed with an appropriate value, and the SIP INVITE message may be passed back to the CSCF of the terminating service provider, which may continue to set up the telephone call to the SIP UA of the terminating service provider. As shown by reference number 738, the SIP UA of the terminating service provider may receive the SIP INVITE message and normal SIP processing of the telephone call may continue. The SIP UA of the terminating service provider may display the enterprise name card that indicates the third party specific user identity.

As indicated above, FIG. 7 is provided as an example. Other examples may differ from what is described with regard to FIG. 7.

Figure 8:
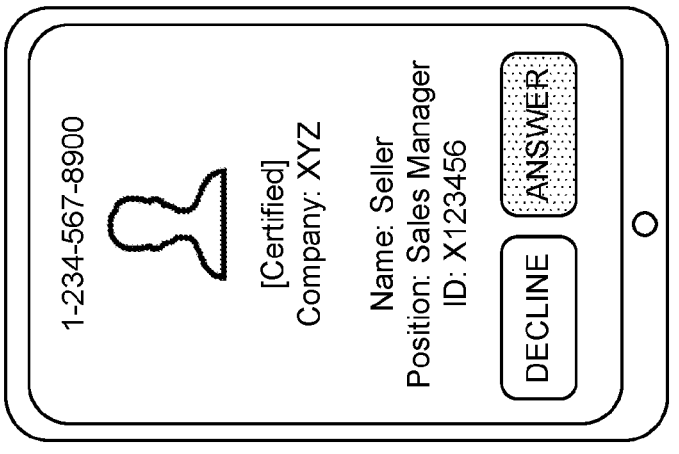
FIG. 8 is a diagram illustrating an example associated with an enterprise name card that indicates a third party specific user identity, in accordance with the present disclosure.

FIG. 8 is a diagram illustrating an example 800 associated with an enterprise name card that indicates a third party specific user identity, in accordance with the present disclosure.

As shown in FIG. 8, a user interface of a SIP UA of a terminating service provider, which may be associated with a UE (e.g., UE 120), may display an enterprise name card that may indicate a third party specific user identity, which may include a name of a user, a telephone number associated with the user, a photo of the user, a user identifier, a position of the user within a company (e.g., sales manager), and/or the company associated with the user. The enterprise name card may include an indication that the third party specific user identity has been certified. The user interface may include a first option to answer a telephone call and a second option to decline the telephone call.

As indicated above, FIG. 8 is provided as an example. Other examples may differ from what is described with regard to FIG. 8.

FIG. 9 is a diagram illustrating an example process 900 performed, for example, by a CSCF of an originating service provider, in accordance with the present disclosure. Example process 900 is an example where the CSCF of the originating service provider (e.g., CSCF 112) performs operations associated with authorizing third party specific user identities.

As shown in FIG. 9, in some aspects, process 900 may include receiving, from a SIP UA of the originating service provider, a SIP INVITE message with a third party specific user identity and a token (block 910). For example, the CSCF of the originating service provider (e.g., using reception component 1102, depicted in FIG. 11) may receive, from a SIP UA of the originating service provider, a SIP INVITE message with a third party specific user identity and a token, as described above.

As further shown in FIG. 9, in some aspects, process 900 may include transmitting the SIP INVITE message to an AAA server via an NEF (block 920). For example, the CSCF of the originating service provider (e.g., using transmission component 1104, depicted in FIG. 11) may transmit the SIP INVITE message to an AAA server via an NEF, as described above.

As further shown in FIG. 9, in some aspects, process 900 may include receiving, from the AAA server via the NEF, an enterprise name card that indicates the third party specific user identity, wherein the enterprise name card is received based at least in part on a verification of the token (block 930). For example, the CSCF of the originating service provider (e.g., using reception component 1102, depicted in FIG. 11) may receive, from the AAA server via the NEF, an enterprise name card that indicates the third party specific user identity, wherein the enterprise name card is received based at least in part on a verification of the token, as described above.

Process 900 may include additional aspects, such as any single aspect or any combination of aspects described below and/or in connection with one or more other processes described elsewhere herein.

In a first aspect, process 900 includes transmitting, to a SIP UA of a terminating service provider, the enterprise name card that indicates the third party specific user identity for display on the SIP UA of the terminating service provider.

In a second aspect, alone or in combination with the first aspect, the token is assigned by the AAA server to the SIP UA of the originating service provider.

In a third aspect, alone or in combination with one or more of the first and second aspects, the enterprise name card that indicates the third party specific user identity indicates one or more of a name of a user, a photo of the user, a user identifier, or a company associated with the user.

In a fourth aspect, alone or in combination with one or more of the first through third aspects, the verification of the token is based at least in part on signaling between the CSCF of the originating service provider and the AAA server via the NEF.

In a fifth aspect, alone or in combination with one or more of the first through fourth aspects, a derivation of the enterprise name card that indicates the third party specific user identity is based at least in part on a SHAKEN framework.

In a sixth aspect, alone or in combination with one or more of the first through fifth aspects, the AAA server is a third party AAA server, and an authorization of the AAA server is based at least in part on the NEF.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by an AAA server, in accordance with the present disclosure. Example process 1000 is an example where the AAA server (e.g., AAA server 111) performs operations associated with authorizing third party specific user identities.

As shown in FIG. 10, in some aspects, process 1000 may include authorizing a use of a third party specific user identity based at least in part on verifying a token associated with a SIP INVITE message with the third party specific user identity (block 1010). For example, the AAA server (e.g., using authorization component 1208, depicted in FIG. 12) may authorize a use of a third party specific user identity based at least in part on verifying a token associated with a SIP INVITE message with the third party specific user identity, as described above.

As further shown in FIG. 10, in some aspects, process 1000 may include transmitting, to a CSCF of an originating service provider via an NEF of the originating service provider, an enterprise name card that indicates the third party specific user identity based at least in part on authorizing the use of the third party specific user identity (block 1020). For example, the AAA server (e.g., using transmission component 1204, depicted in FIG. 12) may transmit, to a CSCF of an originating service provider via an NEF of the originating service provider, an enterprise name card that indicates the third party specific user identity based at least in part on authorizing the use of the third party specific user identity, as described above.

Process 1000 may include additional aspects, such as any single aspect or any combination of aspects described below and/or in connection with one or more other processes described elsewhere herein.

In a first aspect, process 1000 includes transmitting the token to a SIP UA of the originating service provider, wherein the token is assigned to the SIP UA of the originating service provider by the AAA server.

In a second aspect, alone or in combination with the first aspect, the SIP INVITE message is created with the third party specific user identity and the token.

In a third aspect, alone or in combination with one or more of the first and second aspects, the enterprise name card that indicates the third party specific user identity is for display on a SIP UA of a terminating service provider.

In a fourth aspect, alone or in combination with one or more of the first through third aspects, the enterprise name card that indicates the third party specific user identity indicates one or more of a name of a user, a photo of the user, a user identifier, or a company associated with the user.

In a fifth aspect, alone or in combination with one or more of the first through fourth aspects, process 1000 includes authorizing the use of the third party specific user identity based at least in part on signaling between the AAA server and the CSCF of the originating service provider via the NEF of the originating service provider.

In a sixth aspect, alone or in combination with one or more of the first through fifth aspects, a derivation of the enterprise name card that indicates the third party specific user identity is based at least in part on a SHAKEN framework.

In a seventh aspect, alone or in combination with one or more of the first through sixth aspects, the AAA server is a third party AAA server, and an authorization of the AAA server is based at least in part on a network exposure function.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
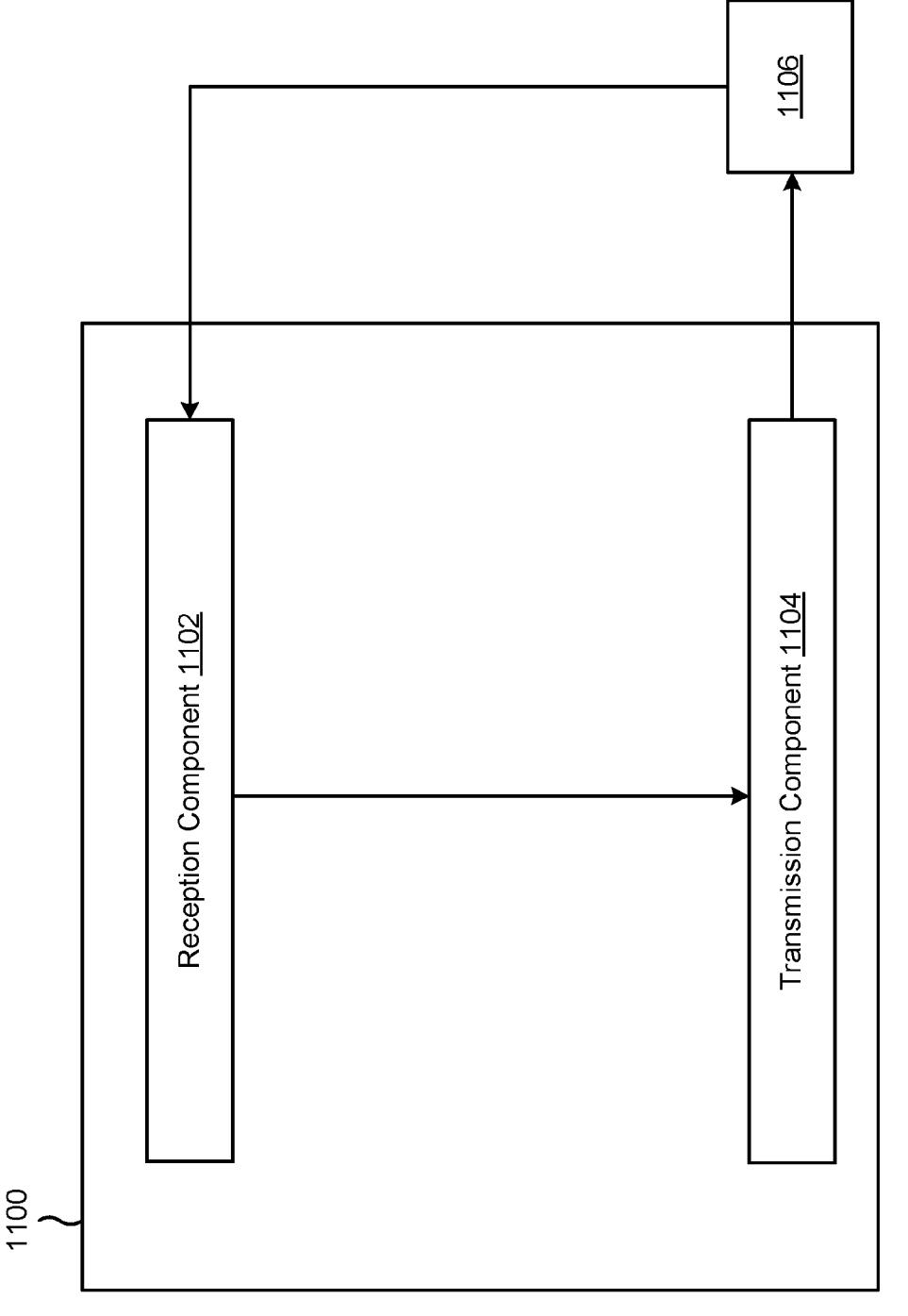
FIGS. 11-12 are diagrams of example apparatuses for wireless communication, in accordance with the present disclosure.

FIG. 11 is a diagram of an example apparatus 1100 for wireless communication. The apparatus 1100 may be a CSCF of an originating network provider, or a CSCF of an originating network provider may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the CSCF of the originating network provider described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the CSCF of the originating network provider described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the CSCF of the originating network provider described in connection with FIG. 2. In some aspects, the transmission component 1104 may be co-located with the reception component 1102 in a transceiver.

The reception component 1102 may receive, from a SIP UA of the originating service provider, a SIP INVITE message with a third party specific user identity and a token. The transmission component 1104 may transmit the SIP INVITE message to an AAA server via an NEF. The reception component 1102 may receive, from the AAA server via the NEF, an enterprise name card that indicates the third party specific user identity, wherein the enterprise name card is received based at least in part on a verification of the token. The transmission component 1104 may transmit, to a SIP UA of a terminating service provider, the enterprise name card that indicates the third party specific user identity for display on the SIP UA of the terminating service provider.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
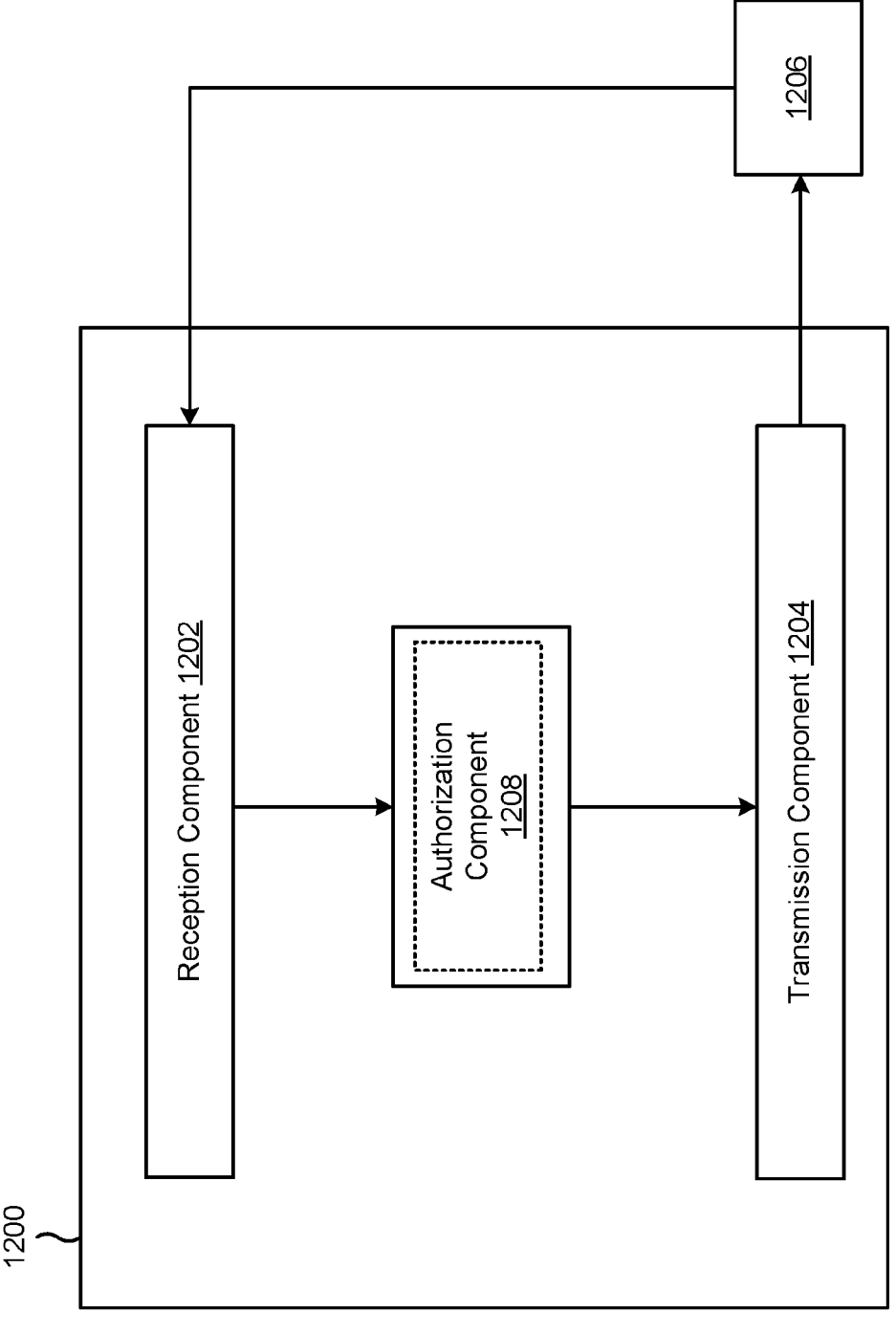

FIG. 12 is a diagram of an example apparatus 1200 for wireless communication. The apparatus 1200 may be a AAA server, or a AAA server may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include an authorization component 1208, among other examples.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the AAA server described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the AAA server described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the AAA server described in connection with FIG. 2. In some aspects, the transmission component 1204 may be co-located with the reception component 1202 in a transceiver.

The authorization component 1208 may authorize a use of a third party specific user identity based at least in part on verifying a token associated with a SIP INVITE message with the third party specific user identity. The transmission component 1204 may transmit, to a CSCF of an originating service provider via an NEF of the originating service provider, an enterprise name card that indicates the third party specific user identity based at least in part on authorizing the use of the third party specific user identity. The transmission component 1204 may transmit the token to a SIP UA of the originating service provider, wherein the token is assigned to the SIP UA of the originating service provider by the AAA server.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a call session control function (CSCF) of an originating service provider for wireless communication, comprising: receiving, from a session initiation protocol (SIP) user agent (UA) of the originating service provider, a SIP INVITE message with a third party specific user identity and a token; transmitting the SIP INVITE message to an authentication, authorization, and accounting (AAA) server via a network exposure function (NEF); and receiving, from the AAA server via the NEF, an enterprise name card that indicates the third party specific user identity, wherein the enterprise name card is received based at least in part on a verification of the token.

Aspect 2: The method of Aspect 1, further comprising: transmitting, to a SIP UA of a terminating service provider, the enterprise name card that indicates the third party specific user identity for display on the SIP UA of the terminating service provider.

Aspect 3: The method of any of Aspects 1 through 2, wherein the token is assigned by the AAA server to the SIP UA of the originating service provider.

Aspect 4: The method of any of Aspects 1 through 3, wherein the enterprise name card that indicates the third party specific user identity indicates one or more of: a name of a user, a photo of the user, a user identifier, or a company associated with the user.

Aspect 5: The method of any of Aspects 1 through 4, wherein the verification of the token is based at least in part on signaling between the CSCF of the originating service provider and the AAA server via the NEF.

Aspect 6: The method of any of Aspects 1 through 5, wherein a derivation of the enterprise name card that indicates the third party specific user identity is based at least in part on a signature-based handling of asserted information using tokens (SHAKEN) framework.

Aspect 7: The method of any of Aspects 1 through 6, wherein the AAA server is a third party AAA server, and wherein an authorization of the AAA server is based at least in part on the NEF.

Aspect 8: A method of wireless communication performed by an authentication, authorization, and accounting (AAA) server, comprising: authorizing a use of a third party specific user identity based at least in part on verifying a token associated with a session initiation protocol (SIP) INVITE message with the third party specific user identity;

and transmitting, to a call session control function (CSCF) of an originating service provider via a network exposure function (NEF) of the originating service provider, an enterprise name card that indicates the third party specific user identity based at least in part on authorizing the use of the third party specific user identity.

Aspect 9: The method of Aspect 8, further comprising: transmitting the token to a SIP user agent (UA) of the originating service provider, wherein the token is assigned to the SIP UA of the originating service provider by the AAA server.

Aspect 10: The method of any of Aspects 8 through 9, wherein the SIP INVITE message is created with the third party specific user identity and the token.

Aspect 11: The method of any of Aspects 8 through 10, wherein the enterprise name card that indicates the third party specific user identity is for display on a SIP UA of a terminating service provider.

Aspect 12: The method of any of Aspects 8 through 11, wherein the enterprise name card that indicates the third party specific user identity indicates one or more of: a name of a user, a photo of the user, a user identifier, or a company associated with the user.

Aspect 13: The method of any of Aspects 8 through 12, wherein authorizing the use of the third party specific user identity is based at least in part on signaling between the AAA server and the CSCF of the originating service provider via the NEF of the originating service provider.

Aspect 14: The method of any of Aspects 8 through 13, wherein a derivation of the enterprise name card that indicates the third party specific user identity is based at least in part on a signature-based handling of asserted information using tokens (SHAKEN) framework.

Aspect 15: The method of any of Aspects 8 through 14, wherein the AAA server is a third party AAA server, and wherein an authorization of the AAA server is based at least in part on a network exposure function.

Aspect 16: An apparatus for wireless communication at a device, comprising a processor; memory coupled with the processor; and instructions stored in the memory and executable by the processor to cause the apparatus to perform the method of one or more of Aspects 1-7.

Aspect 17: A device for wireless communication, comprising a memory and one or more processors coupled to the memory, the one or more processors configured to perform the method of one or more of Aspects 1-7.

Aspect 18: An apparatus for wireless communication, comprising at least one means for performing the method of one or more of Aspects 1-7.

Aspect 19: A non-transitory computer-readable medium storing code for wireless communication, the code comprising instructions executable by a processor to perform the method of one or more of Aspects 1-7.

Aspect 20: A non-transitory computer-readable medium storing a set of instructions for wireless communication, the set of instructions comprising one or more instructions that, when executed by one or more processors of a device, cause the device to perform the method of one or more of Aspects 1-7.

Aspect 21: An apparatus for wireless communication at a device, comprising a processor; memory coupled with the processor; and instructions stored in the memory and executable by the processor to cause the apparatus to perform the method of one or more of Aspects 8-15.

Aspect 22: A device for wireless communication, comprising a memory and one or more processors coupled to the memory, the one or more processors configured to perform the method of one or more of Aspects 8-15.

Aspect 23: An apparatus for wireless communication, comprising at least one means for performing the method of one or more of Aspects 8-15.

Aspect 24: A non-transitory computer-readable medium storing code for wireless communication, the code comprising instructions executable by a processor to perform the method of one or more of Aspects 8-15.

Aspect 25: A non-transitory computer-readable medium storing a set of instructions for wireless communication, the set of instructions comprising one or more instructions that, when executed by one or more processors of a device, cause the device to perform the method of one or more of Aspects 8-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a call session control function (CSCF) of an originating service provider for wireless communication, comprising:
    receiving, from a session initiation protocol (SIP) user agent (UA) of the originating service provider, a SIP INVITE message with a third party specific user identity and a token;
    transmitting the SIP INVITE message to an authentication, authorization, and accounting (AAA) server via a network exposure function (NEF); and
    receiving, from the AAA server via the NEF, an enterprise name card that indicates the third party specific user identity, wherein the enterprise name card is received based at least in part on a verification of the token.

2. The method of claim 1, further comprising:
    transmitting, to a SIP UA of a terminating service provider, the enterprise name card that indicates the third party specific user identity for display on the SIP UA of the terminating service provider.

3. The method of claim 1, wherein the token is assigned by the AAA server to the SIP UA of the originating service provider.

4. The method of claim 1, wherein the enterprise name card that indicates the third party specific user identity indicates one or more of: a name of a user, a photo of the user, a user identifier, or a company associated with the user.

5. The method of claim 1, wherein the verification of the token is based at least in part on signaling between the CSCF of the originating service provider and the AAA server via the NEF.

6. The method of claim 1, wherein a derivation of the enterprise name card that indicates the third party specific user identity is based at least in part on a signature-based handling of asserted information using tokens (SHAKEN) framework.

7. The method of claim 1, wherein the AAA server is a third party AAA server, and wherein an authorization of the AAA server is based at least in part on the NEF.

8. A method of wireless communication performed by an authentication, authorization, and accounting (AAA) server, comprising:
    authorizing a use of a third party specific user identity based at least in part on verifying a token associated with a session initiation protocol (SIP) INVITE message with the third party specific user identity; and
    transmitting, to a call session control function (CSCF) of an originating service provider via a network exposure function (NEF) of the originating service provider, an enterprise name card that indicates the third party specific user identity based at least in part on authorizing the use of the third party specific user identity.

9. The method of claim 8, further comprising:
    transmitting the token to a SIP user agent (UA) of the originating service provider, wherein the token is assigned to the SIP UA of the originating service provider by the AAA server.

10. The method of claim 8, wherein the SIP INVITE message is created with the third party specific user identity and the token.

11. The method of claim 8, wherein the enterprise name card that indicates the third party specific user identity is for display on a SIP UA of a terminating service provider.

12. The method of claim 8, wherein the enterprise name card that indicates the third party specific user identity indicates one or more of: a name of a user, a photo of the user, a user identifier, or a company associated with the user.

13. The method of claim 8, wherein authorizing the use of the third party specific user identity is based at least in part on signaling between the AAA server and the CSCF of the originating service provider via the NEF of the originating service provider.

14. The method of claim 8, wherein a derivation of the enterprise name card that indicates the third party specific user identity is based at least in part on a signature-based handling of asserted information using tokens (SHAKEN) framework.

15. The method of claim 8, wherein the AAA server is a third party AAA server, and wherein an authorization of the AAA server is based at least in part on a network exposure function.

16. An apparatus of a call session control function (CSCF) of an originating service provider for wireless communication, comprising:
    a memory; and
    one or more processors, coupled to the memory, configured to:
    receive, from a session initiation protocol (SIP) user agent (UA) of the originating service provider, a SIP INVITE message with a third party specific user identity and a token;
    transmit the SIP INVITE message to an authentication, authorization, and accounting (AAA) server via a network exposure function (NEF); and
    receive, from the AAA server via the NEF, an enterprise name card that indicates the third party specific user identity, wherein the enterprise name card is received based at least in part on a verification of the token.

17. The apparatus of claim 16, wherein the one or more processors are configured to:
    transmit, to a SIP UA of a terminating service provider, the enterprise name card that indicates the third party specific user identity for display on the SIP UA of the terminating service provider.

18. The apparatus of claim 16, wherein the token is assigned by the AAA server to the SIP UA of the originating service provider.

19. The apparatus of claim 16, wherein the enterprise name card that indicates the third party specific user identity indicates one or more of: a name of a user, a photo of the user, a user identifier, or a company associated with the user.

20. The apparatus of claim 16, wherein the verification of the token is based at least in part on signaling between the CSCF of the originating service provider and the AAA server via the NEF.

21. The apparatus of claim 16, wherein a derivation of the enterprise name card that indicates the third party specific user identity is based at least in part on a signature-based handling of asserted information using tokens (SHAKEN) framework.

22. The apparatus of claim 16, wherein the AAA server is a third party AAA server, and wherein an authorization of the AAA server is based at least in part on the NEF.

23. An apparatus of an authentication, authorization, and accounting (AAA) server, comprising:

a memory; and one or more processors, coupled to the memory, configured to:

authorize a use of a third party specific user identity based at least in part on verifying a token associated with a session initiation protocol (SIP) INVITE message with the third party specific user identity; and transmit, to a call session control function (CSCF) of an originating service provider via a network exposure function (NEF) of the originating service provider, an enterprise name card that indicates the third party specific user identity based at least in part on authorizing the use of the third party specific user identity.

24. The apparatus of claim 23, wherein the one or more processors are configured to:

transmit the token to a SIP user agent (UA) of the originating service provider, wherein the token is assigned to the SIP UA of the originating service provider by the AAA server.

25. The apparatus of claim 23, wherein the SIP INVITE message is created with the third party specific user identity and the token.

26. The apparatus of claim 23, wherein the enterprise name card that indicates the third party specific user identity is for display on a SIP UA of a terminating service provider.

27. The apparatus of claim 23, wherein the enterprise name card that indicates the third party specific user identity indicates one or more of: a name of a user, a photo of the user, a user identifier, or a company associated with the user.

28. The apparatus of claim 23, wherein the one or more processors are configured to authorize the use of the third party specific user identity based at least in part on signaling between the AAA server and the CSCF of the originating service provider via the NEF of the originating service provider.

29. The apparatus of claim 23, wherein a derivation of the enterprise name card that indicates the third party specific user identity is based at least in part on a signature-based handling of asserted information using tokens (SHAKEN) framework.

30. The apparatus of claim 23, wherein the AAA server is a third party AAA server, and wherein an authorization of the AAA server is based at least in part on a network exposure function.

* * * * *